UNITED STATES PATENT OFFICE.

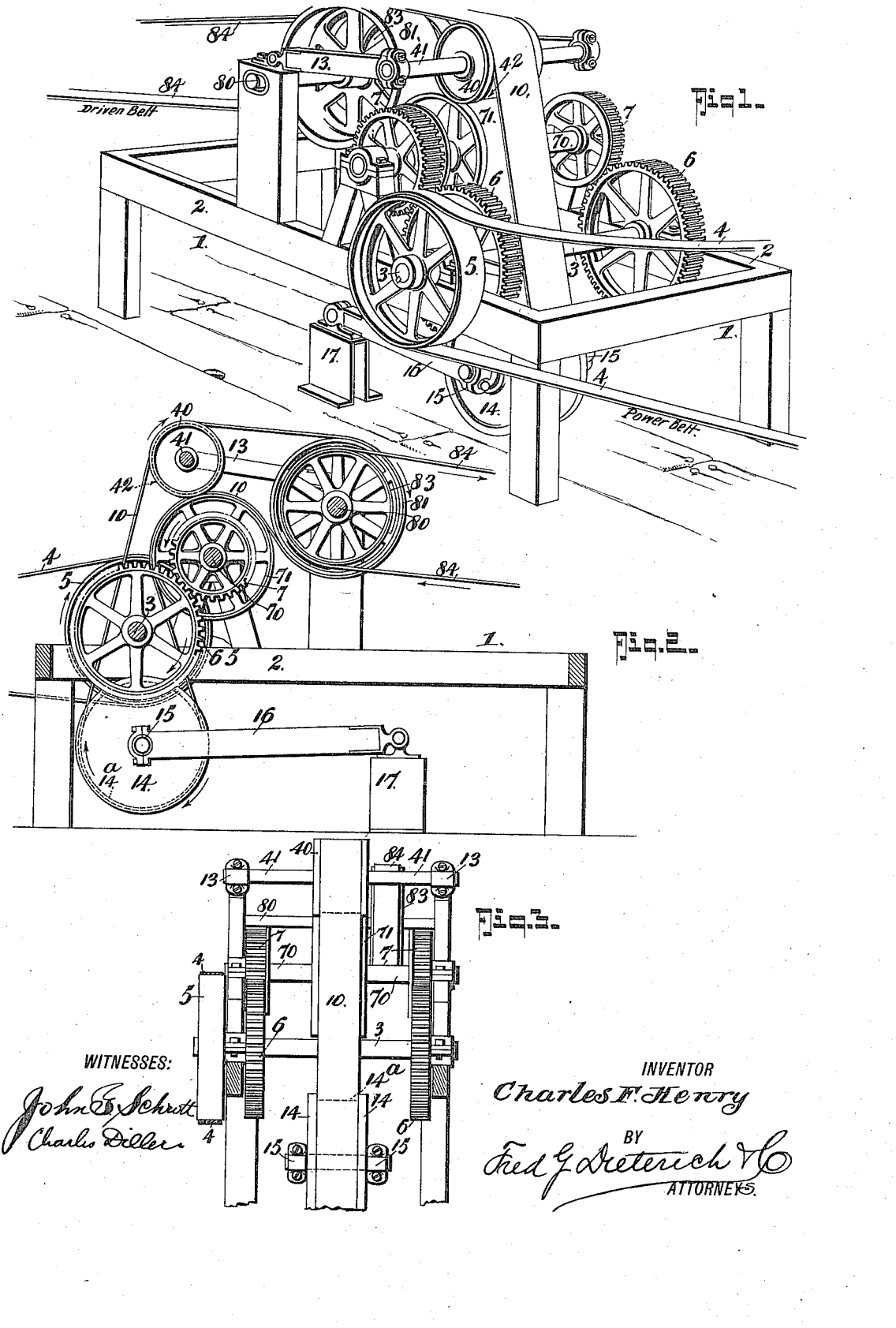

CHARLES F. HENRY, OF LENTS, OREGON.

POWER-TRANSMITTING MECHANISM.

1,148,383. Specification of Letters Patent. Patented July 27, 1915.

Application filed November 25, 1914. Serial No. 873,900.

*To all whom it may concern:*

Be it known that I, CHARLES F. HENRY, residing at Lents, in the county of Multnomah and State of Oregon, have invented certain new and useful Improvements in Power-Transmitting Mechanisms, of which the following is a specification.

This invention has reference to that class of mechanical power mechanisms in which means are included for coöperating with a driving shaft and a driven shaft for increasing the speed of the said driven shaft and my invention primarily has for its object to provide an improved mechanism of the general character stated which may be readily adapted for use and effectively serve its intended purposes.

With other objects in view that will hereinafter appear, my invention consists in the peculiar construction and combination of parts hereinafter explained, specifically pointed out in the appended claim and illustrated in the accompanying drawing, in which:

Figure 1 is a perspective view of my improved mechanical power mechanism. Fig. 2 is a side elevation thereof, parts being in section. Fig. 3 is an end view of the same, parts being in section.

In the drawing, 1 designates a suitable framing on the horizontal beams 2 of which, and near one end thereof, is mounted a driving shaft 3 to which power is applied in any well-known manner, a power belt 4 being shown as applied to a pulley 5, mounted on the said shaft.

6—6 denote driving gears mounted on the shaft 3, one near each end thereof, and they are held in mesh with a pair of smaller diameter gears 7—7, fixedly mounted upon a supplemental shaft 70, suitably journaled on the main frame and which carries a pulley 71 that acts as a combined fly wheel and as a belt pulley, as will presently more fully appear.

As is best shown in Fig. 2, the shaft 70 is located above and between the said shaft 3 and the driven shaft 80 that carries a belt pulley 81 larger in diameter than the pulley 71 which in turn is larger than the gears 7. Shaft 80 also carries a pulley 83 over which passes the driven belt 84 in practice coupled with the machine to be driven.

10 designates an endless belt that passes around the pulley 81, passes over the upper face of the fly wheel pulley 71, under a weighted tension pulley 14, and over a combined guide and belt holding roller 40 mounted on a shaft 41 journaled in the outer ends of arms 13, pivotally mounted on the main frame.

Tension pulley 14 is mounted on a shaft journaled in end bearings 15 on the outer ends of side bars 16 hingedly secured to a fixed support 17, as shown.

To hold the endless power transmission belt from lateral displacement the pulley 14 is peripherally grooved, as at 14$^a$ and the pulley 40 is likewise grooved as at 42, see Fig. 2, from which it will be also noticed that since the weighted tension pulley 14 is mounted in hinged side arms 16, the same serves as a belt tightener and causes the belt 10 to remain in tight frictional contact with the several pulleys engaged thereby, and since the belt passes over the roller 40 and as the tension on the belt tends to always pull the said roller 40 down against the pulley 71, the belt, as it passes between the said roller 40 and the pulley 71 is positively held down on the pulley 71 and from lateral displacement.

By reason of constructing and arranging the parts that constitute my improved power transmitting mechanism in the manner shown and described, a simple and effective means is provided in which the several intermeshing gears may be relatively of such diameters as the character of the machine elements to be driven may make necessary.

In the drawing, the intermeshing gears are arranged on a substantially two-to-one ratio and hence the speed of the driven pulley 81 is double that of the driving pulley 5.

By utilizing an endless belt drive with the gear connection arranged as shown, a compact and economical power transmission means is provided that can, under slight modifications, be adapted for use and to suit the requirements of the driven shaft 89.

The gravity or weighted pulley 14 serves to keep the friction belt at an even tension and also to cause the said belt to hold the pulley 40 down against the belt, where it passes over the pulley 71 and thus insure the proper engagement of the endless belt with the several pulleys engaged thereby.

What I claim is:

A power transmission mechanism comprising a driving shaft and a driven shaft, a belt pulley mounted on the driven shaft, a driving gear on the said driving shaft, a supplemental shaft located between the driving and the driven shafts, a belt pulley and a gear on the said supplemental shaft, the said gear meshing with the said driving gear and the said pulley being disposed in edgewise alinement with the pulley on the driven shaft, an endless belt that passes over the pulley on the supplemental shaft and around the pulley on the driven shaft, means for keeping the said belt under an even tension to thereby transmit motion from the driving and supplemental shafts to the driven shaft, and a further means for holding the belt in proper engagement with the several pulleys, the said means including a presser roller, and hingedly mounted bearing arms that support the said roller, the first mentioned means comprising a gravity or drop pulley, and hingedly supported arms on which the said drop pulley is mounted, the aforesaid endless belt passing around the gravity pulley and over the presser roller.

CHARLES F. HENRY.

Witnesses:
JOHN R. CLEMENT,
HANS T. ESBENSEN.

Copies of this patent may be obtained for five cents each, by addressing the "Commissioner of Patents, Washington, D. C."